United States Patent [19]
Rhea

[11] Patent Number: 5,040,936
[45] Date of Patent: Aug. 20, 1991

[54] BARRIER FOR LIFT PLATFORM

[75] Inventor: Michael A. Rhea, Hutchinson, Kans.

[73] Assignee: Mobile-Tech Corporation, Hutchinson, Kans.

[21] Appl. No.: 482,820

[22] Filed: Feb. 21, 1990

[51] Int. Cl.[5] ........ B60P 1/44
[52] U.S. Cl. ........ 414/540; 187/9 R; 414/921
[58] Field of Search ........ 414/539–541, 414/545, 537, 921; 187/9 R

[56] References Cited

U.S. PATENT DOCUMENTS

| | | | |
|---|---|---|---|
| 3,651,965 | 3/1972 | Simonelli et al. | 414/540 |
| 4,124,130 | 11/1978 | Rohrs et al. | 414/539 |
| 4,353,436 | 10/1982 | Rice et al. | 414/540 X |
| 4,442,921 | 4/1984 | Sherman | 414/539 X |
| 4,534,450 | 8/1985 | Savaria | 187/9 R |
| 4,556,128 | 12/1985 | Thorley et al. | 414/921 X |
| 4,607,996 | 8/1986 | Koch | 414/921 X |
| 4,792,274 | 12/1988 | Cockram | 414/537 |
| 4,804,308 | 2/1989 | Hamblin et al. | 414/540 |
| 4,907,936 | 3/1990 | Bourdage | 414/921 X |

FOREIGN PATENT DOCUMENTS

| | | | |
|---|---|---|---|
| 944319 | 3/1974 | Canada | 414/545 |
| 2717207 | 11/1978 | Fed. Rep. of Germany | 414/537 |
| 152937 | 7/1987 | Japan | 414/921 |

*Primary Examiner*—David A. Bucci
*Attorney, Agent, or Firm*—Kokjer, Kircher, Bradley, Wharton, Bowman & Johnson

[57] ABSTRACT

A safety barrier for a vehicle mounted lift for wheelchairs is normally in an upright blocking position even when the lift platform is at a ground level. The barrier includes upper and lower panels which are hinged together and coupled with a pair of lever arms. A tubular slide coupled with each lever arm cooperates with a rigid link to bias the forward ends of the arms to elevated positions to maintain the barrier in an upright position. When the lever arms are manually lowered, the barrier upper and lower panels fold upon themselves to provide a ramp over which a wheelchair may be rolled for loading onto the lift platform. The arms are supported by the links in cantilevered positions and are connected to the panels for absorbing by deflection of the arms the energy from impacts from the wheelchair against the barrier.

22 Claims, 2 Drawing Sheets

BARRIER FOR LIFT PLATFORM

BACKGROUND OF THE INVENTION

This invention relates to vehicle mounted lift devices, and more particularly, to a safety barrier for such a device which prevents accidental falling of a wheelchair from the lift.

Transportation of persons confined to wheelchairs is greatly facilitated by the use of wheelchair lifts mounted on the transporting vehicles. These lifts typically comprise a powered platform which elevates the wheelchair and occupant from ground level to a height sufficient to allow the wheelchair to be maneuvered into the vehicle. This allows a person to board the vehicle while remaining seated in the wheelchair and without the difficulties attendant upon dismounting the person from the wheelchair. Likewise, the lift is also utilized to return the wheelchair and occupant to ground level when disembarking the vehicle.

The safety features of a wheelchair lift are of critical importance because the wheelchair is highly mobile and could inadvertently roll off of the lift platform. The height to which the wheelchair must be elevated to provide entry into a vehicle such as a van or bus mandates that great care be exercised to prevent injuries which would result if the wheelchair would fall from the platform. The platforms are subject to intermittent movements during the lifting and lowering process which could cause the wheelchair to begin rolling. Further, the drive mechanism in powered wheelchairs may also be inadvertently engaged during the loading process and cause the wheelchair to move with considerable force. Such unexpected movements can and sometimes do result in serious injury when the wheelchair falls from the lift platform.

In order to reduce the opportunity for a wheelchair to roll off the loading platform, safety barriers or rails have been provided on the sides and open end of the platform. While many of such barriers have succeeded in minimizing the risk for injury to users of the lifts on which they are installed, a need has developed for even greater security in this respect. Many barriers currently in use are subject to the possibility that they may not always be operative when the lift is in use. Some barriers are not strong enough to positively assure against accident and resultant injury.

The design of more effective safety barriers for lift platforms is now receiving considerable attention. Because of the many safety hazards possible with the use of conventional wheelchair lifts and the effect which such hazards have on the public health and safety, the U.S. Department of Transportation, Urban Mass Transportation Administration, has promulgated safety specifications which are proposed for wheelchair lifts. These specifications require that a lift be provided with an outer barrier which retains a wheelchair on the lift platform under all reasonably anticipated conditions when the platform is above the ground loading position. This requires a barrier which will always be in proper position during the lifting and lowering operations and which is capable of absorbing the tremendous energy from the impact of a loaded wheelchair under maximum power without falling and without permitting the wheelchair to climb over the barrier under such conditions.

SUMMARY OF THE INVENTION

It is an object of this invention to provide an outer barrier for a wheelchair or similar type lift which barrier is insured of being in its operative position while the lift is above ground loading position but which can be conveniently moved to the loading position by the lift operator.

It is another object of the present invention to provide a barrier which is constructed in a manner to absorb virtually all of the energy involved in the impact of a loaded wheelchair against the barrier without effecting damage to the barrier and without diminishing the effectiveness of the barrier for maintaining the wheelchair on the lift to prevent injury to the wheelchair occupant.

Still another very important object of the instant invention is to provide a lift outer barrier having a construction wherein the barrier yields slightly under impact from a wheelchair in a manner to increase, rather than diminish the function of securing the wheelchair on the lift platform.

In the accomplishment of the foregoing object, it is another object of this invention to provide a safety barrier for use with a wheelchair lift, which barrier is hinged to fold upon an object such as a wheel of a wheelchair impacting the barrier from the platform, thereby preventing the wheelchair from rolling up and over the barrier.

It is a further object of this invention to provide a wheelchair lift with a safety barrier which may be manually folded outwardly from the platform surface so that it may function not only as a barrier to maintain a wheelchair on the platform but also as a ramp to facilitate the loading and unloading of the wheelchair.

A further object of the invention is to provide a barrier of this kind which can be automatically moved to its folded condition as the lift platform is folded to its standby position, thereby eliminating the disadvantages from any projecting of the barrier into the interior or of the vehicle passenger space and also obviating the necessity for operator attention for accomplishing the movement of the barrier into and out of its folded, stand-by position.

To accomplish these and other related objects of the invention, a wheelchair lift is provided with a safety barrier comprising rigid upper and lower panels which are hinged together for movement between a generally upright blocking position and a lowered position in which the panels are folded together to present an access ramp for the lift. The panels are normally maintained in the upright position by relatively rigid arms which extend between the upper panel and slide members on the lift, and are pivotally connected thereto. Rigid, pivoting links are also coupled with the arms to position the forward end of the arms in elevated, cantilevered positions in disposition for absorbing energy from impacts of the wheelchair against the barrier. The safety barrier may be manually or otherwise lowered to the ramp configuration by a lift operator but the spring biased slide members automatically return the safety barrier to an upright blocking position upon release by the operator.

BRIEF DESCRIPTION OF THE DRAWINGS

Turning now to the drawings in which like reference numerals are used to indicate like parts in the various views.

DESCRIPTION OF THE PREFERRED EMBODIMENT

Figure 1:
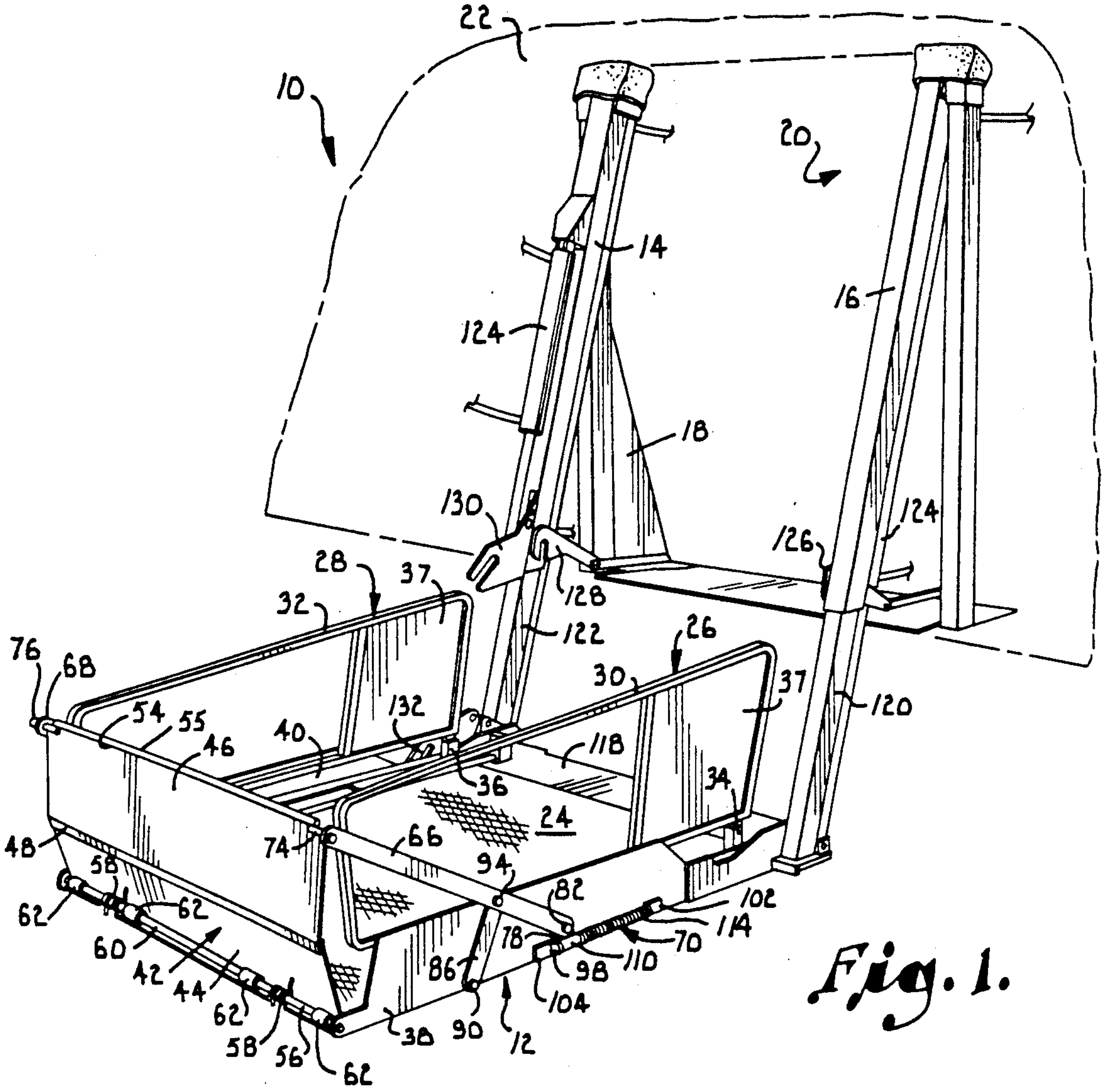
FIG. 1 is a side perspective view of a vehicle mounted wheelchair lift provided with a barrier embodying the principles of the present invention.

Turning now to the drawings in greater detail and initially to FIG. 1, a vehicle-mounted lift for wheelchairs and other items is represented broadly by the numeral 10. Lift 10 comprises a lifting platform 12 which is coupled by telescoping extension arms 14 and 16 to a suitable frame 18 which is mounted in a doorway 20 of a vehicle 22. Vehicle 22 will typically be a van or bus which is adapted for transporting persons confined to wheelchairs. The lift 10 is particularly suited for loading the wheelchairs from a ground level into the vehicle 22 for transport and then unloading the wheelchair and occupant at the desired destination.

Lifting platform 12 includes a deck 24 which desirably is perforate and presents a non-slip surface. Certain types of expanded metal are well adapted for this purpose but other materials may also be utilized. Platform 12 also includes a pair of collapsible side barriers 26 and 28 which are positioned on opposite side edges of deck 24. The side barriers 26 and 28 each include an upper rail portion 30 and 32 mounted to multiple posts 34 and 36 which are hinged to the deck 24 by a suitable mechanism (not shown). One or more panels 37 of clear plastic or other material ma be secured to the rails 30 and 32 to close the opening in the rails if desired. Upstanding flanges 38 and 40 are positioned outside of the side barriers and are rigidly secured to the deck to prevent entry or egress along the side edges of the deck.

Lift 10 and the components described to this point are conventional. The invention resides in a novel outer safety barrier which may be advantageously combined with lift 10 as will be hereinafter explained.

Figures 3, 4, 5:
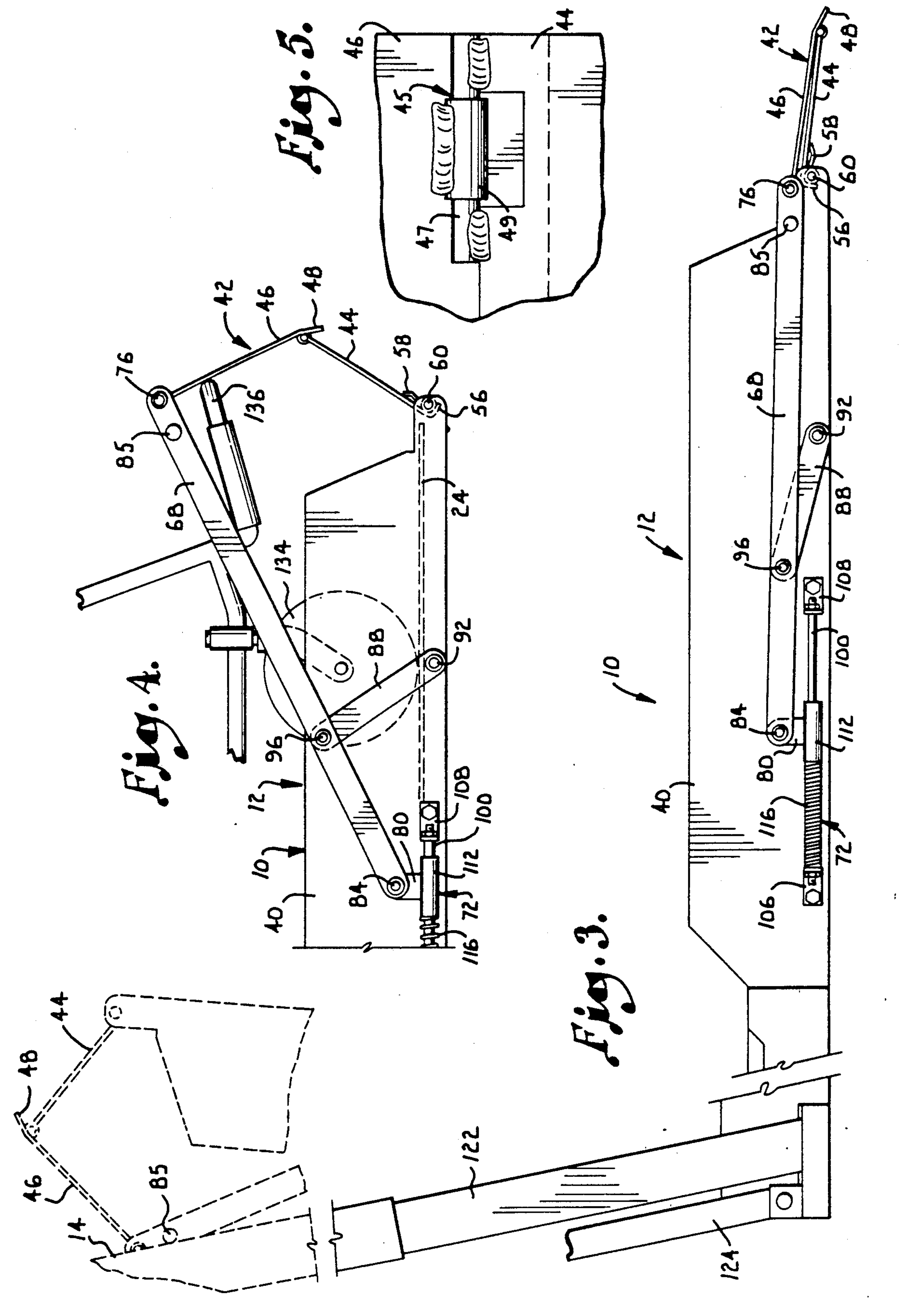
FIG. 3 is an enlarged, fragmentary side elevation view of the lift and barrier shown in a loading position and with broken lines illustrating the position of the safety barrier immediately prior to stowage of the lift in a doorway of the vehicle.
FIG. 4 is a fragmentary side elevation view similar to FIG. 2 but showing the lift on a reduced scale and with a forward portion of a wheelchair shown in contact with the panels of the outer safety barrier.
FIG. 5 is a fragmentary, elevation view taken in the direction of the arrows along line 5-5 of FIG. 2 and showing a hinged connection between upper and lower panels of the outer safety barrier.

An outer barrier 42 embodying the principles of this invention is positioned at an outer edge of the platform deck 24 and includes a lower panel 44 which is secured by a plurality of identical, spaced apart hinges 45 (only one of which is shown in FIG. 5) to an upper panel 46 for limited swinging movement about the axis of hinge rods 47 welded to panel 44 and received in corresponding hinge tubes 49 which are welded to panel 46. The panels 44 and 46 are elongated and extend substantially between the side edges of the platform deck. When in an upright barrier position such as illustrated in FIG. 1, the outer barrier desirably extends above the top surface of deck 24 a distance of approximately twelve inches. The panels 44 and 46 preferably are formed from sheet metal or other similar rigid materials which are capable of receiving an impact, such as from a wheelchair, without experiencing appreciable nonelastic deformation.

Figure 2:
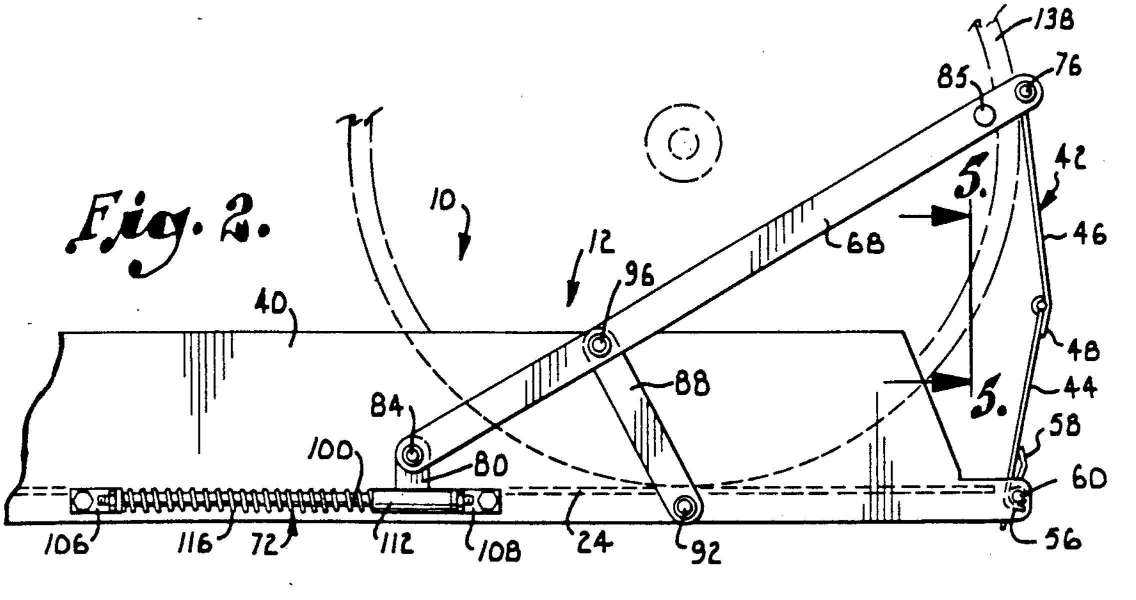
FIG. 2 is an enlarged, fragmentary side elevation view of the lift of FIG. 1, with portions removed for illustration purposes and with a rear wheel of a wheelchair represented by broken lines and shown in contact with the panels of the outer safety barrier of the lift.

Turning additionally to FIGS. 2 and 4, it can be seen that a bottom edge of the upper panel 46 includes a lowered lip 48 bent at an angle from the plane of the panel and which overlaps an outer marginal edge portion of the lower panel 44 along the entire length thereof. A bar 55 is welded to the upper panel 46 to reinforce the upper panel edge 54.

The bottom edge of lower panel 44 is turned out at an angle to form a flange 56 which extends beneath a transversely extending hinge rod 60 which has its respective ends mounted in the upright flanges 38 and 40 carried at the sides of platform deck 24 by a platform frame (not shown). Rod 60 is positioned slightly beneath the plane of deck 24. Four spaced apart, tubular hinge members 62 welded to the face of panel 44 and to flange 56 telescopically receive the elongated rod 60 to hingedly secure panel 44 to platform 12 for swinging movement of the panel about the rod.

A pair of torsion springs 58 are mounted on rod 60 as shown best in FIG. 1 of the drawing. Springs 58 are configured so that one leg of each spring bears against the frame of platform 12 and the other leg of the spring bears against panel 44 to exert a biasing force against the panel in a direction tending to hold the panels in the raised positions as shown in FIG. 1 and 2. Flange 56 is cut out at the locations for springs 58 to permit the spring legs to bear against the platform frame.

Barrier 42 also includes a pair of elongated, relatively rigid arms 66 and 68 which are positioned on opposite sides of the platform. The lowermost ends of the respective arms 66 and 68 are pivotally coupled with corresponding tubular slides 70 and 72 as will be further described hereinafter. The lever arms 66 and 68 preferably are fabricated from steel or similar material having high tensile and shear strengths to withstand the relatively high loads which may be placed on the arms during use of the lift and barrier.

The outer ends of the arms 66 and 68 are pivotally secured to the upper edge portion of the upper panel 46 by pivot pins 74 and 76 which are welded to the respective ends of rod 55 in longitudinal extension of the rod. Pins 74 and 76 extend through the holes in the corresponding arms and pivotally couple the arms to panel 46. The opposite, inner ends of arms 66 and 68 are each secured in similar fashion to corresponding tubular slide flanges 78 and 80 by pivot pins 82 and 84 respectively. A manually engagable rigid projection 85 is rigidly secured to arm 68 and projects outwardly from the arm near the connection of the arm with panel 46 as shown in FIGS. 2-4.

A pair of relatively short links 86 and 88 each pivotally couples its corresponding arm 66 or 68 to the platform adjacent the side flanges 38 and 40. Links 86 and 88 are substantially shorter than the arms 66 and 68 but may be constructed of similar materials. One end of each link is pivotally secured to its corresponding flange 38 or 40 by its respective pivot pin 90 or 92. Pivot pins 90 and 92 are placed slightly below the platform deck 24 in the same plane as the transverse rod 60 which is coupled with barrier lower panel 44. The other end of each link is likewise pivotally coupled to its respective arm by another pivot pin 94 or 96 respectively.

The angle between an imaginary line extending through the pins 94 or 96 and the corresponding pins 82 and 84, and an imaginary line drawn through the pins 94 or 96 and the corresponding pins 90 or 92 should be slightly less than a right angle and preferably about 88° when the barrier is in its raised position to create a slight over center condition which initially resists folding of the elements. The links 86 and 88 cooperate with the tubular slides 70 and 72 to provide for the movement of the arms 66 and 68 between their lowered positions as shown in FIG. 3 and their raised position as shown in FIGS. 1 and 2. The links afford moving fulcrums for the pivoting of the arms. At the same time, the slides permit translation movement of the arms as will be apparent.

Tubular slides 70 and 72 each includes a rod 98 or 100 respectively mounted by suitable L-shaped brackets 102–108 to the outer surface of side flanges 38 and 40, thereby positioning the arms 66–68 and links 86–88 spaced outwardly from the flanges 38 and 40. The rods 98 and 100 are mounted in the same plane as the transverse rod 60 but extend perpendicular thereto. Each slide also includes a cylindrical member 110 or 112 respectively which travels along its corresponding rod 98 or 100. The cylindrical members are restricted to travel along their corresponding rods 98 or 100 between the rod mounting brackets. A spring 114 or 116 is provided on each respective rod to bias the corresponding cylindrical members 110 and 112 to forward positions in the direction of the barrier panels 44 and 46. The previously described flanges 78 and 80 which mount the arms 66 and 68 are welded to and carried by the corresponding cylindrical members.

It is preferred that links 86 and 88 be positioned slightly over center (i.e. the angles between the members and corresponding links measured on the inboard side of the links be slightly less than the angles measured on the outboard side) so that there is a "locked" condition when the barrier is in its full upright position. Downward force on the members having an inwardly direct component of force causes lowering of the barrier. An operator standing alongside the lift can easily supply such force by engaging a foot on projection 85 and pushing downwardly and inwardly towards the vehicle. The inwardly directed component of force causes the slides 110 and 112 to move against the bias of the corresponding springs 114 and 116 to accommodate the rotation of the links back across dead-center and downwardly as the components of the barrier move to the collapsed condition.

On the other hand, forces which are meant to be resisted by the barrier, such as outwardly directed forces from a wheelchair or from a powered wheelchair wheel trying to crawl up and over the barrier, cannot rotate the links out of their slightly over center positions locking the barrier in its upright condition. It will be appreciated that this constructional feature is important to the functioning of the barrier in a manner to achieve optimum security.

The rear or inner edge of the platform deck 24 includes a bridge plate 118. The deck is secured to the lower extension members 120 and 122 of telescoping extension arms 14 and 16. One or more hydraulic cylinders 124 are provided for powered movement of the lifting platform between its ground level, vehicle level and stowed positions. Various brackets 126, 128 and 130 with cam slots are provided to place the platform in the desired position during elevation and stowage thereof. The particular design and placement of these positioning brackets is not central to the present invention. Hand held controls and a power source (not shown) are utilized for operation of the lifting platform 12.

When the lift 10 is used to load an individual in a wheelchair into the vehicle 22, the lifting platform 12 is unfolded from its stowed position in doorway 20 in a conventional manner which need not be described here. It suffices to say that the platform outer barrier 42 is in its raised position once it is unfolded from the stowed position and during movement of the platform.

The platform is then lowered from the vehicle floor level to the ground level. Once the platform 12 is in contact with the ground surface, the lift operator must lower the outer safety barrier 42 before the wheelchair may be rolled onto the platform deck 24. To accomplish this, the operator simply places his foot on the outwardly extending projection 85 and presses downwardly and slightly inwardly until the barrier is in the position illustrated in FIG. 3. The wheelchair may then be rolled over the ramp formed by the folded barrier 42 and positioned on the platform deck. The operator may then release projection 85 to return the barrier to its upright position as illustrated in FIGS. 1 and 2. The lifting platform may then be elevated until the deck 24 is level with the plane of the vehicle floor, whereupon the wheelchair may be rolled across the bridge plate 118 and into the vehicle 22. A passenger may be unloaded from the vehicle by simply reversing these steps.

It can be seen that barrier 42 provides an effective obstruction to prevent the wheelchair from being accidentally rolled or driven off the outer edge of the platform. Importantly, the barrier is automatically maintained in its upright blocking position at all times when a wheelchair is on the platform. Barrier 42 is maintained in its upright position by operation of the tubular slides 70 and 72, arms 66 and 68 and links 86 and 88. Since the barrier construction at both sides is identical, the operation may be described for the components appearing in FIG. 2, it being understood that the corresponding components on the opposite side function in like manner.

The tubular slide spring 100 acts against the cylindrical member 112 to bias it to a forward position. The arm 68 which is connected to the cylindrical member is thereby forced to a forward position with the short link 88 acting as a moving fulcrum to raise the forward end of the arm approximately twelve inches above the platform deck. Arm 66 is operated in identical fashion to that described for arm 68 and the two arms conjointly hold the outer barrier panels 44 and 46 in their upright positions.

While the components just described can serve to raise the barrier panels and hold them in the raised position, it has been found advantageous to augment the force exerted by springs 114 and 116 for this purpose by installing the torsion springs 58 on rod 60. The torsion springs operate directly on panel 44 and bias the barrier to its raised position. This insures against any sticking or binding of the operative components and insures that the barrier is immediately raised to its blocking position whenever force for moving the barrier to its lowered position is removed from projection 85.

The action of the operator to lower outer barrier 42 for loading or unloading a wheelchair overcomes the biasing force of springs 114, 116 and 58. This is accomplished by application of a force to projection 85 toward platform 12 as described above. A component of the force applied to the projection is rearwardly directed. This rearwardly directed force causes the respective cylindrical members 110 and 112 to move rearwardly on their respective slide rods to compress the springs 114 and 116. As the rear end of the each arm moves along its slide, the links pivot to permit the arms to also pivot so that they lie in a plane parallel to the plane of platform deck 24 but slightly spaced thereabove.

The hinged connection between the lower and upper panels 44 and 46 and the hinged connection of the lower panel to the platform permits the panels to fold outwardly against the bias of springs 58 when the barrier is lowered so that the ramp extends from the edge of the platform without obstructing any of the upper surface of the platform deck. The components are constructed to maintain a small angular relationship between the panels when the barrier is in its raised position as shown in FIG. 2. This insures that the panels will always fold with the hinged interconnection between them moving outwardly when the barrier is moved to its lowered position. The angled lip 48 provided on the lower edge of upper panel 46 extends toward the ground surface as shown in FIG. 3 to facilitate rolling of the wheelchair onto the ramp. The lip also advantageously serves to restrict the swinging of the panels to maintain the angled relationship between them and to prevent the barrier from collapsing inwardly when in an upright position.

The outer barrier 42 is particularly wellsuited for absorbing impacts from a rolling or driven wheelchair without allowing the wheelchair to break through the barrier. As can be seen in FIG. 4, when a forward portion such as a front wheel 134 or a footrest 136 of the wheelchair impacts the barrier, the hinged connection between the lower and upper panels 44 and 46 causes the barrier to yield or fold slightly outwardly about the hinged connection between the panels 44 and 46. This tends to envelop the striking object, thereby resisting any tendency for the object to glance up and over the barrier.

The force from the impact is transferred to the two relatively rigid, strong arms 66 and 68, tending to attempt to pull the outer ends of the arms downwardly. Since the impact is directed outwardly of the barrier, there is no rearwardly directed component of the force imparted to the arms which would tend to move the cylindrical slides 70 and 72 against the bias of springs 114 and 116 and away from the positions of the slides at the forward ends of their respective paths of reciprocal travel on their corresponding slide rods. With the lowermost ends of arms 66 and 68 held against moving rearwardly, the points 96 of pivotal connection of links 86 and 88 to the arms remain fixed and the rigid links brace the arms against swinging downwardly. This insures that the barrier remains in its upright position despite the impact.

The energy from such an impact must be absorbed and in a manner which neither adversely affects the function of the barrier nor results in damage to the structure. Due to the arrangement of parts of barrier 42 wherein the load from the impact is ultimately applied to the ends of cantilevered beams (arms 66 and 68), the energy from impact causes slight downward deflection or elastic bending of the arms. While a surprising amount of energy can result from impacts of this kind, the level of such energy is well below that which would exceed the elastic strength of the relatively rugged, steel arms. Thus, the energy is relatively rapidly dissipated in the slight, harmless, spring like deflecting of the arms after which they quickly return to their undeformed condition. The amount of deflecting is extremely slight and does not impair the safety function of the barrier in any way. In fact, the slight outward movement of the hinge between the panels increases the inward facing concavity of the cross-sectional profile of the panels as shown in FIG. 4. This decreases any tendency for the wheelchair to deflect up and over the barrier.

Thus, the outer barrier 42 is well-suited to prevent wheelchairs, even those which are motor-driven, from impacting and then climbing over the barrier. As is best shown in FIG. 2, if a large diameter rear wheel 138 of the wheelchair contacts the upper panel 46, the wheel is blocked by the panels. Even if wheel 138 should continue to turn, as might occur with motorized wheelchairs, the height and inward cant of the upper panel 46 prevents the wheel from achieving the traction necessary to climb over the barrier.

It should also be noted that the construction of the barrier 42 greatly facilitates stowage of the barrier when the lift is retracted into the vehicle. When the lift platform is swung toward the stowage position as shown in broken lines in FIG. 3, the projection 85 on arm 68 contacts member 14 of the doorway mounted frame 18. Continued inward swinging of the platform to its stowed position also forces the barrier to its folded condition in the same manner as described in connection with manual operation of the barrier. The barrier is held by the engagement of projection 85 against the lift frame until the platform is again unfolded from its stowed position. As the platform is swung in a direction away from the frame, the barrier automatically moves to its raised position under the bias of the springs.

From the foregoing, it will be seen that this barrier is well adapted to attain all the ends and objects hereinabove set forth together with other advantages which are readily apparent and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A safety barrier for an outer edge of a wheelchair lift platform to prevent inadvertent movement of the wheelchair across the edge, said barrier comprising:

collapsible panel means adapted to be secured to the platform adjacent said edge for movement of the panel means between a collapsed position permitting movement of a wheelchair over said panel means and across said platform edge and a raised position of the panel means physically blocking movement of the wheelchair across said edge;

at least one elongated, relatively rigid arm having a pair of ends, one end of the arm being pivotally coupled to the panel means and the other end of the arm being adapted to be pivotally coupled to the platform whereby swinging of the arm with respect to said platform moves the panel means to and from said respective positions; and spring means operably associated with the arm biasing the latter to hold the panel means in its raised position, said spring means being yieldable to permit swinging of the arm to move the panel means to its collapsed position allowing movement of a wheelchair on and off the platform, said panel means comprising a pair of elongated substantially planar panels each having a pair of elongated sides, and hinge means operably coupled with each panel for interconnecting the panels along a side of each panel for movement of the panels from positions with one panel plane disposed in general extension from the other panel plane when the panel means is in its raised position, to positions with the plane of one panel folded back along the plane of the other panel when the panel means is in said collapsed position.

2. The invention of claim 1, wherein said panel means includes means carried by one panel and engagable with the other panel for limiting the relative swinging of said panels to less than 180°.

3. The invention of claim 2, wherein said swinging limiting means includes an elongated lip carried by one panel and extending along said side.

4. The invention of claim 3, wherein said lip is bent at an angle from the plane of said one member and projects from said hinge means to facilitate movement of a wheelchair over the folded panels when the panel means is in said collapsed position.

5. The invention of claim 1, wherein said arm is pivotally connected to said one panel proximal the side of the latter remote from said hinge means, the side of said other panel remote from the hinge means being adapted to be pivotally coupled to said platform, whereby the swinging of said arm in one direction with respect to the platform moves the panels to said collapsed position.

6. The invention of claim 5, wherein said barrier includes a pair of said arms, each being adapted to be pivotally coupled with the platform, there being an arm for each end of said panel means, the arms being pivotally coupled with said one panel proximal the side thereof remote from said hinge means.

7. The invention of claim 6, wherein each of said arms is pivotally coupled to a slide mounted on the platform for reciprocable movement parallel with the plane of the platform and perpendicular to axis of pivotal coupling of the panel means to the platform.

8. The invention of claim 7, wherein said spring means includes a spring provided for each slide respectfully, each spring being operable to bias its respective slide in a direction toward the panel means.

9. The invention of claim 8, and an elongated, rigid link for each arm respectively, each link being pivotally coupled with its corresponding arm intermediate its point of pivotal coupling with its slide and with the panel means, each link being adapted to be pivotally coupled with the platform, whereby the links serve as fulcrums for the swinging and translation of the respective arms during movement between said collapsed and raised positions for the barrier.

10. A safety barrier for a vehicle-mounted lift having a load platform and means for raising and lowering said platform, said barrier comprising:

a rigid elongated upper panel;

a rigid elongated lower panel having a longitudinal lower edge for hinged attachment to an edge portion of said loading platform and a longitudinal upper edge which is hingedly secured to an edge of the upper panel;

an elongated, relatively rigid arm having forward and rearward ends, the forward end of the arm being coupled with the upper panel;

biasing means coupled with the arm for entering a force on the arm to urge the upper and lower panels into generally upright positions, said arm being swingable against the force of the biasing means to fold the upper panel onto the lower panel, thereby permitting loading of the platform from said edge when the safety barrier is attached thereto.

11. The invention of claim 10, wherein the biasing means includes a fulcrum link having one end for attachment to the platform and another end pivotably attached to the arm.

12. The invention of claim 11, wherein said biasing means includes a slide which is pivotally coupled with a rearward end portion of the arm to confine forward and aft movement thereof to a plane parallel to the platform, said slide cooperating with the fulcrum link to confine movement of the forward end of the lever arm to a plane generally perpendicular to the platform.

13. The invention of claim 12, wherein said slide includes a spring urging the lever arm to a forward elevated position to maintain the upper and lower panels in the generally upright position.

14. A barrier for an edge of a wheelchair lift platform, said barrier comprising:

a pair of elongated, relatively rigid, spaced apart arms, each arm having a pair of ends, one end of each arm being adapted to be coupled to the platform in spaced relationship from said edge with the arms extending towards the edge;

means coupled with each arm and adapted to be coupled with the platform for holding the arms in dispositions cantilevered upwardly from the platform with the other ends of said arms spaced vertically from the platform and proximal said edge; and panel means secured to the arms proximal said other ends and depending therefrom in disposition to be engaged by a wheelchair on the platform moving toward said edge to prevent movement of the wheelchair over said edge, the cantilevered arms being sufficiently elastic to absorb energy from impact of the wheelchair against the panel means secured to the arms.

15. The invention of claim 14, wherein said panel means is carried by said arms and is adapted to be secured to said platform in proximity to said edge.

16. The invention of claim 15, wherein said edge is substantially straight and wherein said panel means comprises a pair of elongated, relatively rigid planar panels, one of said panels being adapted to be pivotally coupled with the platform for swinging movement about an axis extending generally parallel with the plane of said one panel and said edge respectively, hinge means interconnecting said panels for folding on one another, and means pivotally coupling the panels with the arms, the axis of pivotal connection of the respective panels to the arms and the axis of pivotal connection of the panels to the platform being parallel with the axis of interconnection of said panels to each other, whereby an impact against said panels by a wheelchair on the platform moving toward said edge pulls downwardly on the arms and is absorbed in deflecting said arms.

17. The invention of claim 16, wherein said hinge means interconnecting the panels includes structure permitting outward swinging of each panel respectively in response to impact from an object against a side of said panels facing the platform, whereby outward swinging of the panels deflects said arms to permit folding of the panels into a concave configuration tending to envelop said object to resist glancing of the object over the barrier.

18. The invention of claim 16, wherein said arm holding means comprises an elongated, rigid link for each arm respectively, each link being pivotally connected to its corresponding arm intermediate the ends of the latter, and each link being adapted to be pivotally coupled to the platform, said one end of each arm being coupled to platform by means permitting both pivoting of the arms with respect to the platform and shifting movement of the arms toward and away from the platform.

19. The invention of claim 18, wherein said arms are adapted for coupling to the platform for pivoting about a common axis, and wherein the links are coupled to the arms for pivoting about a common axis and are adapted to be coupled with the platform for pivoting about a common axis, the arms extending parallel with one another and the axes of pivotal movement of the arms with respect to the platform being parallel with the axes of the pivotal movement of the panels with respect to the platform and the axes of pivotal movement of the links with respect to the arms and platform respectively, whereby the arms may be swung downwardly to cause the panels to fold upon one another.

20. The invention of claim 19, wherein said barrier includes spring means operably coupled with said arms and adapted to be coupled with said platform for biasing the arms in a direction opposite to said downward swinging movement, whereby said panels are held by the arms under the biasing force of said spring means in unfolded disposition extending upwardly from the platform edge.

21. The invention of claim 20, wherein said panel means interconnects said arms to hold the latter in mutual parallelism, and wherein said barrier includes means carried by one of said arms and adapted to be engaged by an operator for swinging said arms downwardly to fold said panels.

22. A barrier for an edge of a planar wheelchair lift platform, said barrier comprising:

a collapsible wall means having upper and lower edges, the lower edge of the wall means being secured to the platform adjacent said edge for movement of the wall means between a collapsed position with the wall means upper edge being lowered permitting movement of a wheelchair over the wall means and across said platform edge, and a raised position of the wall means with the upper edge of the latter elevated from the lower edge thereof disposing the wall means to physically block movement of the wheelchair across said platform edge;

at least one elongated, relatively rigid arm having a pair of ends, one end of the arm being operably connected to the upper edge of said wall means for moving the latter between said positions responsive to movement of said one end of the arm;

pivot means mounted on the platform and manually movable on a reciprocable path of travel generally parallel to the plane of the platform, said pivot means being pivotally coupled with the other end of said arm;

an elongated, rigid link pivotally coupled to the platform and to said arm intermediate said ends of the latter, said link being disposed to provide a prop holding the arm in disposition with one end of the arm holding the wall means in its raised position when said pivot means is at a first position on its reciprocable path of travel, said link being swingable to permit movement of the arm to a position moving the wall means to its collapsed position when said pivot means is moved to a second position on its path of travel; and means biasing said pivot means toward said first position, whereby the wall means is held in disposition to prevent movement of a wheelchair across the platform edge except when the pivot means is moved to said second position.

* * * * *